(12) United States Patent
Tichy et al.

(10) Patent No.: US 8,185,271 B2
(45) Date of Patent: May 22, 2012

(54) METHODS AND DEVICE FOR DETERMINING THE ROLL ANGLE FOR OCCUPANT PROTECTION DEVICES

(75) Inventors: Marc A. Tichy, Tuebingen (DE); Andreas Schaefers, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 11/989,883

(22) PCT Filed: Sep. 26, 2006

(86) PCT No.: PCT/EP2006/066723
§ 371 (c)(1),
(2), (4) Date: Jul. 9, 2010

(87) PCT Pub. No.: WO2007/051672
PCT Pub. Date: May 10, 2007

(65) Prior Publication Data
US 2011/0082614 A1   Apr. 7, 2011

(30) Foreign Application Priority Data
Nov. 2, 2005  (DE) .......................... 10 2005 052 251

(51) Int. Cl.
*B60R 21/00* (2006.01)

(52) U.S. Cl. ........... 701/45; 180/271; 180/282; 280/735
(58) Field of Classification Search ................. 180/271, 180/282; 280/734, 735; 701/36, 45
See application file for complete search history.

(56) References Cited

U.S. PATENT DOCUMENTS

| | | | |
|---|---|---|---|
| 6,169,946 B1 * | 1/2001 | Griessbach | 701/45 |
| 6,170,594 B1 * | 1/2001 | Gilbert | 180/282 |
| 6,192,305 B1 | 2/2001 | Schiffmann | |
| 6,315,074 B1 | 11/2001 | Achhammer | |
| 6,345,218 B1 * | 2/2002 | Yamanaka et al. | 701/41 |
| 6,374,171 B2 * | 4/2002 | Weiberle et al. | 701/71 |
| 6,424,897 B1 | 7/2002 | Mattes et al. | |
| 6,560,519 B2 * | 5/2003 | Williams et al. | 701/45 |
| 6,681,196 B2 * | 1/2004 | Glaser et al. | 702/151 |
| 6,862,512 B2 * | 3/2005 | Arndt et al. | 701/70 |
| 7,031,816 B2 * | 4/2006 | Lehmann et al. | 701/48 |
| 7,057,503 B2 * | 6/2006 | Watson | 340/440 |
| 7,162,340 B2 * | 1/2007 | Schubert et al. | 701/38 |

(Continued)

FOREIGN PATENT DOCUMENTS
DE   19744083   4/1999
(Continued)

OTHER PUBLICATIONS

International Search Report, PCT International Patent Application No. PCT/EP2006/066723 dated Jan. 24, 2007.

*Primary Examiner* — Paul N Dickson
*Assistant Examiner* — Laura Freedman
(74) *Attorney, Agent, or Firm* — Kenyon & Kenyon LLP

(57) ABSTRACT

A method and device for determining a roll angle for occupant protection devices. Transverse acceleration and vertical acceleration of a vehicle are detected, and the roll angle of the vehicle is estimated on the basis of the detected lateral acceleration and the detected vertical acceleration, additional driving dynamics quantities, including a vehicle speed, a yaw angle and a float angle being determined, and centripetal acceleration being calculated from these driving dynamics quantities, formula, to improve the estimate of the roll angle.

10 Claims, 3 Drawing Sheets

U.S. PATENT DOCUMENTS

| | | | |
|---|---|---|---|
| 7,797,125 B2* | 9/2010 | Schmid et al. | 702/141 |
| 2010/0211245 A1* | 8/2010 | Tichy et al. | 701/29 |

FOREIGN PATENT DOCUMENTS

| | | |
|---|---|---|
| DE | 19814154 | 10/1999 |
| DE | 19962687 | 7/2001 |
| EP | 1270337 | 1/2003 |
| JP | 6-227228 | 8/1994 |
| JP | 2000-289637 | 10/2000 |
| JP | 2007-76584 | 3/2007 |
| WO | WO 01/44020 | 6/2001 |
| WO | WO 03/026933 | 4/2003 |

* cited by examiner

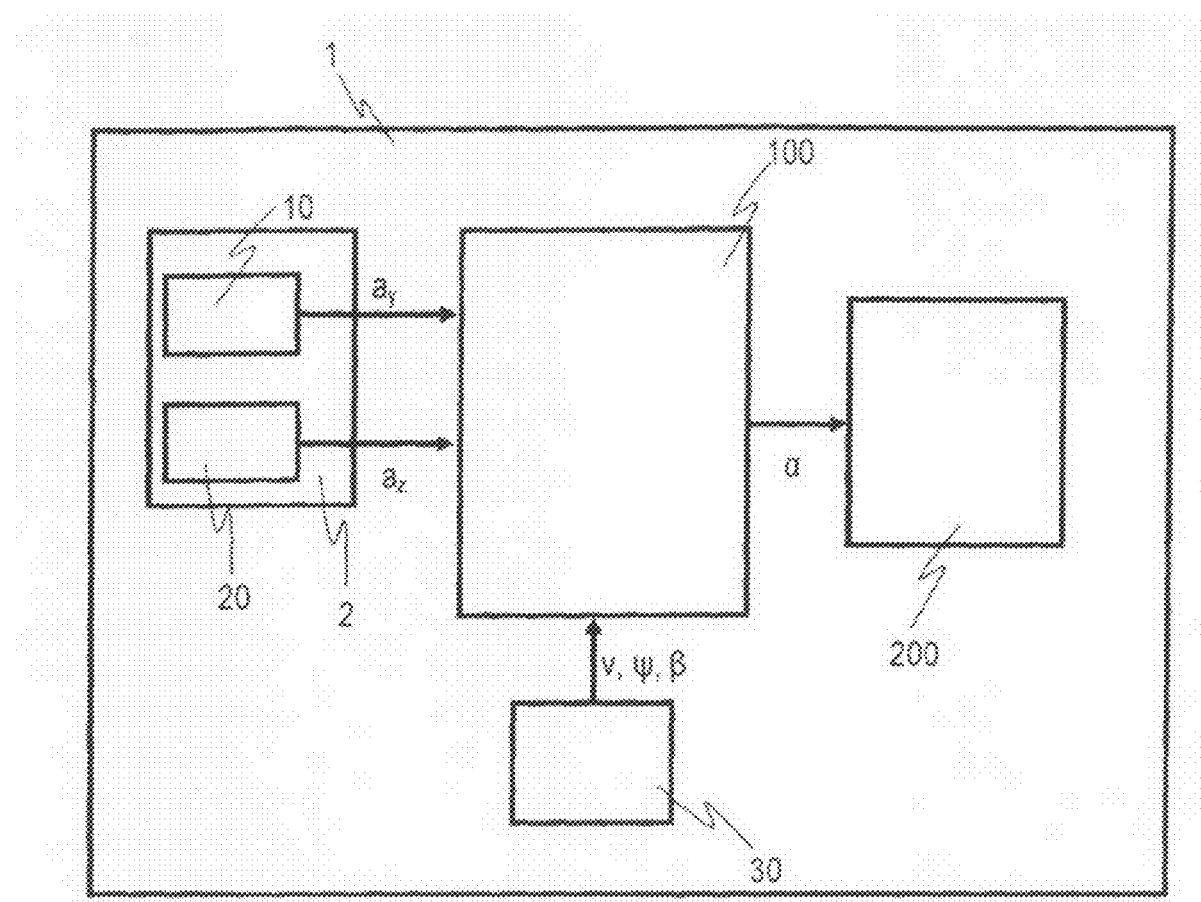
Figur 1
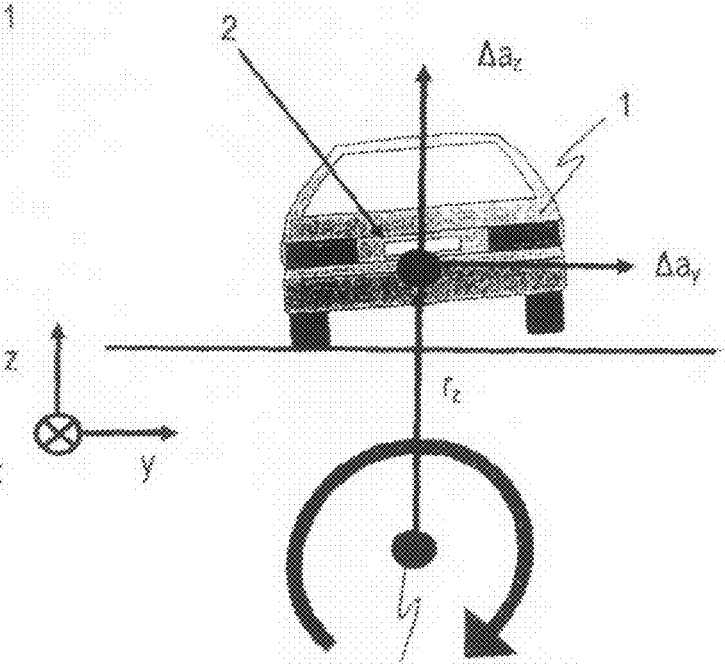
Figur 2

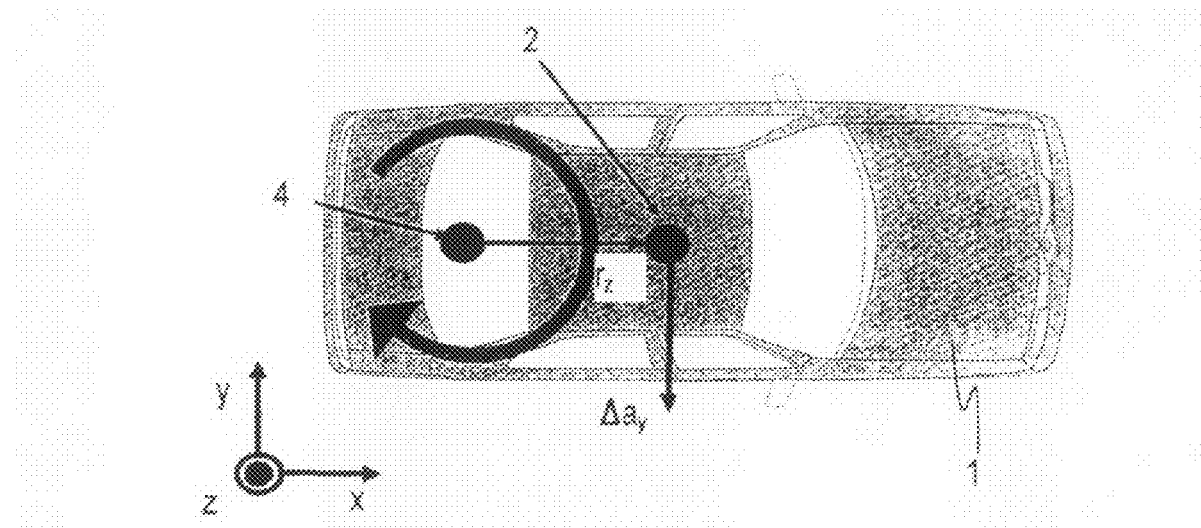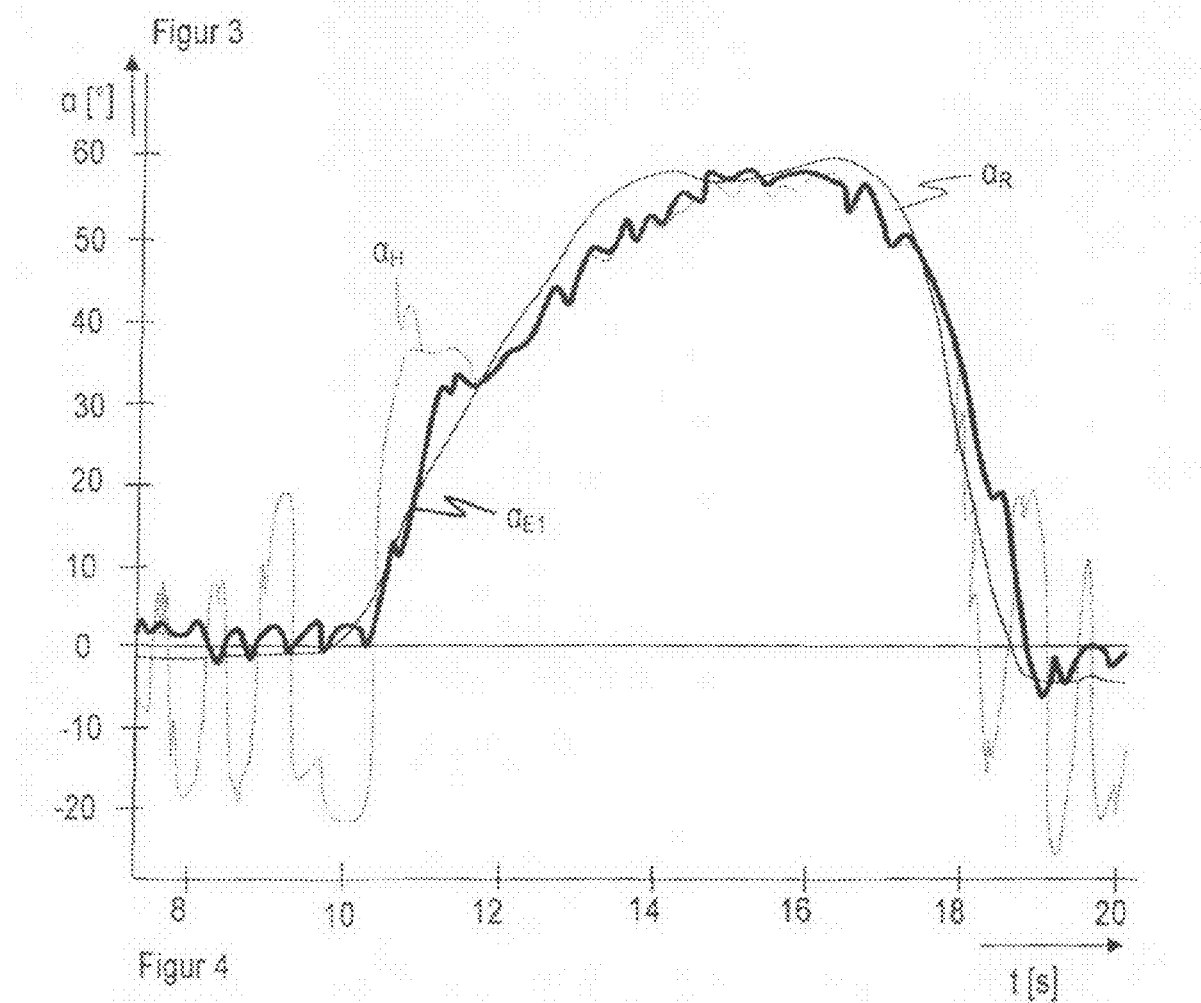

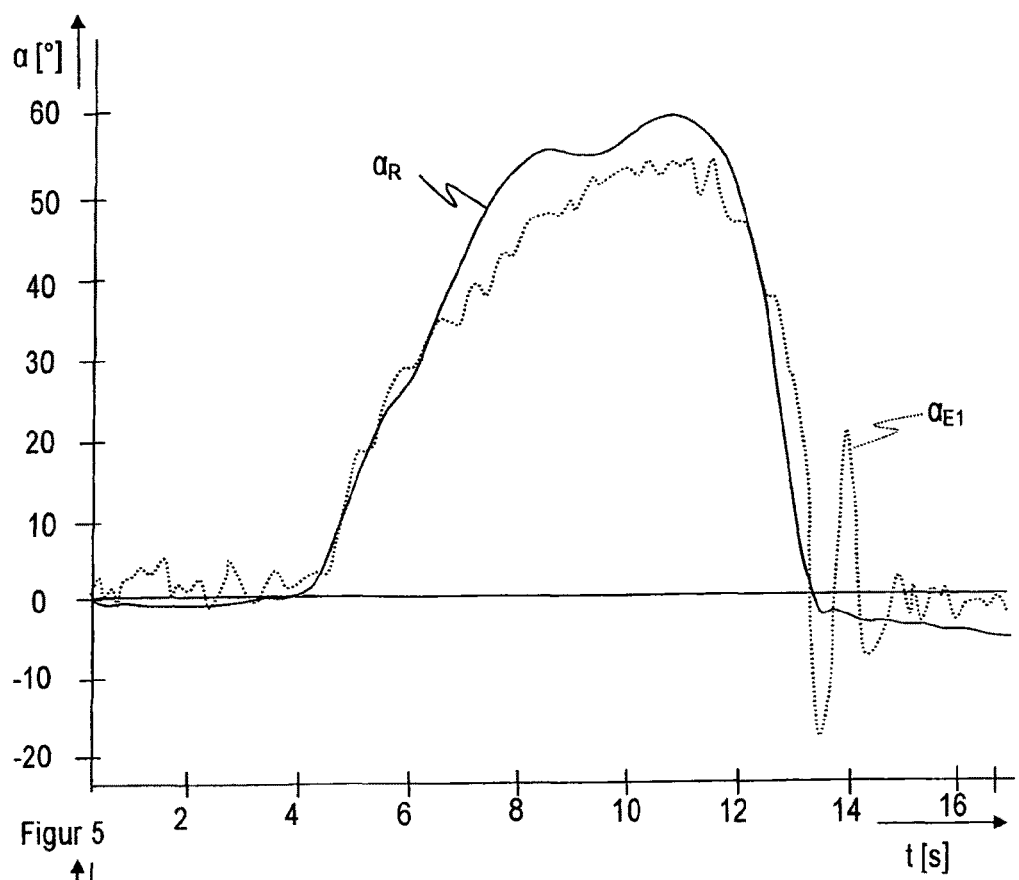
Figur 5
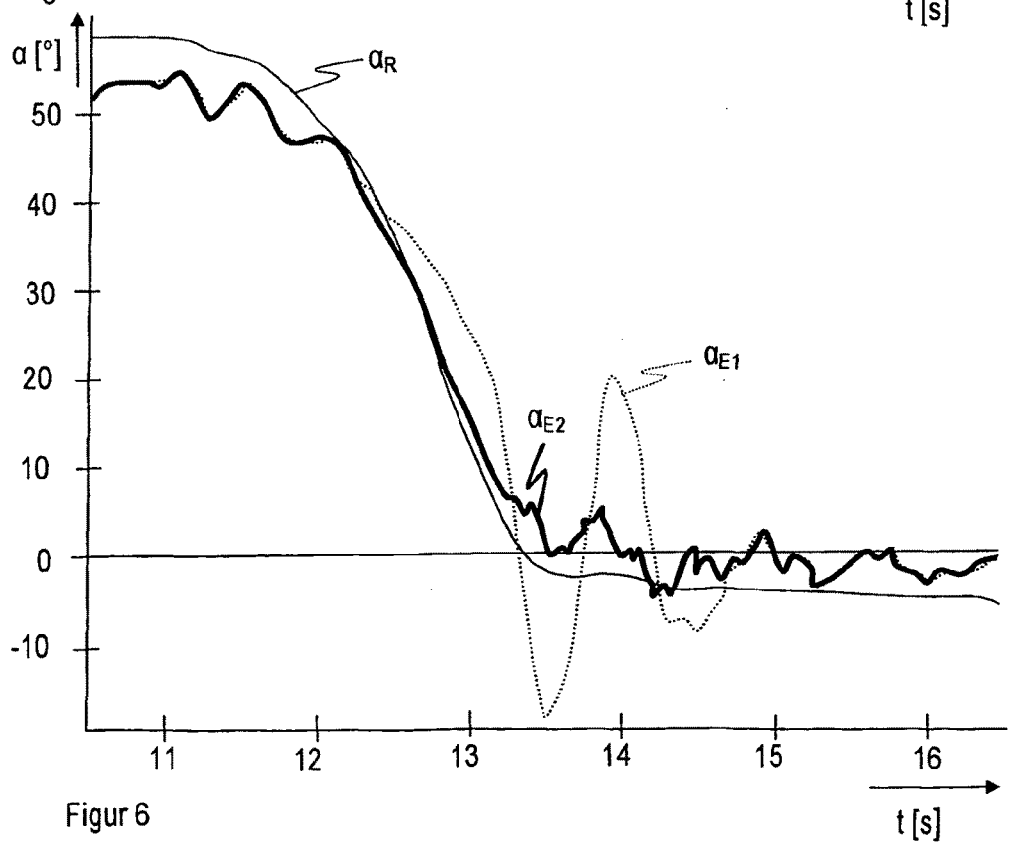
Figur 6

METHODS AND DEVICE FOR DETERMINING THE ROLL ANGLE FOR OCCUPANT PROTECTION DEVICES

FIELD OF THE INVENTION

The present invention is directed to a method and device for determining the roll angle for occupant protection devices.

BACKGROUND INFORMATION

Statistics from the United States demonstrate the importance of passive safety in vehicle rollovers. In 1998, half of all single vehicle fatalities were attributed to a rollover. Vehicle rollovers account for approximately 20% of all vehicular accidents.

Traditional rollover detection systems consider the rolling motion and accelerations in x, y, and z directions of the vehicle. Reliable detection of a vehicle rollover is possible on this basis, but a decision as to whether a rollover is occurring is made only at a late point in time in the rollover. In certain cases of vehicle rollover preceded by an electronic stability maneuver, the occupant experiences a high transverse acceleration. Such maneuvers may result in a type of rollover known as a soil-trip rollover. In this regard, there is still potential for future occupant protection systems with regard to deployment behavior.

Conventional methods are based on analysis of a yaw rate sensor, for example, and two acceleration sensors that are integrated into a central airbag control unit. The yaw rate sensor ascertains the rotational speed about the longitudinal axis of the vehicle according to the gyroscope principle, and acceleration sensors additionally measure the vehicle acceleration in both the transverse and the vertical directions. The yaw rate is then analyzed in the main algorithm. Using the measured values from the acceleration sensors, it is possible to ascertain the type of rollover, but in addition, these values are used for a plausibility check. If the yaw rate algorithm detects a rollover, the safety devices are activated only if there is a simultaneous release by the plausibility check.

In another conventional method, a timely deployment decision in the case of a rollover having a high transverse acceleration is made possible by including a float angle and the lateral speed of the vehicle. In a conventional method for expanded rollover detection, an estimate of the lateral speed is made on the basis of a yaw rate and the vehicle speed in the longitudinal direction, taking into account the transverse acceleration, and this lateral speed represents a measure of the rollover probability of the vehicle in the case of lateral drift into the median strip. The float angle, as it is called, is used to determine the lateral speed.

In general, early deployment decisions for occupant protection devices, e.g., window airbags, are necessary and appropriate for a rollover. In addition to the lateral vehicle speed, the roll angle at the start of such a rollover event therefore constitutes an important quantity for predicting the rollover event. In cases of deployment decisions for irreversible occupant protection devices, the roll angle in particular plays an important role, so that the knowledge of the roll angle may be used to make a deployment decision accordingly earlier.

In the case of the conventional technical approaches, the signals of the transverse and vertical acceleration sensors are used only to detect the type of rollover and to perform a plausibility check on the roll rate measured using a roll rate sensor and the roll angle is calculated therefrom. For example, International Application WO 2001/044020 describes a method for determining the absolute angle of rotation of an object rotating about a horizontal axis, the absolute angle of rotation of the vehicle being able to be ascertained in a limited interval via a vertical acceleration sensor and a roll rate sensor.

With the conventional methods, the roll angle is not estimated independently of a roll rate sensor, which should ideally yield an independent estimate of the angle by integrating the roll rate over time. In addition, it is very difficult to determine very small angles (<5°) due to sensor noise of the roll rate sensor.

SUMMARY

An example method according to the present invention for determining the roll angle for occupant protection devices may have the advantage over the related art that the roll angle may be estimated continuously with the help of the signals of a transverse acceleration sensor and a vertical acceleration sensor, independently of the roll rate sensor and without restriction of the roll angle range, and may be made available at an early point in time to at least one deployment method for occupant protection devices. Through the example method according to the present invention, additional driving dynamics quantities are ascertained for calculation of the centripetal acceleration, including a vehicle speed, a yaw angle and a float angle, so that the estimate of the roll angle is advantageously improved. These additional driving dynamics sensor data may be made available, for example, by other sensor units in the vehicle, for example, an electronic stability program system (ESP system). On the whole, the example method according to the present invention may advantageously yield a more accurate and more stable direct roll angle estimate, in particular in the range of small roll angles. Due to the more accurate and more stable roll angle made available, the subsequent deployment methods for occupant protection systems are able to detect vehicle rollovers promptly, making it possible to ensure that safety devices such as seat belt tighteners, head airbags, window airbags and roll bars are activated promptly and therefore the risk of injury to the occupants is reduced. The example method according to the present invention for determining the roll angle thus advantageously allows an improvement in the calculation of deployment decisions for occupant protection systems.

As an additional advantage, the example method according to the present invention for determining the roll angle increases the robustness of subsequent deployment methods, in particular in the range of small roll angles, and improves their reset performance. Therefore, improved deployment efficiency is advantageously achievable, stable driving situations and misuse are more recognizable, and inadvertent deployment of irreversible restraining devices may be prevented. The combination with sensor systems already integrated into the vehicle yields an increased benefit here with regard to the stability and robustness of the deployment method, so that rollover detection in off-road vehicles in particular may be improved due to the very robust deployment method. On the basis of the vehicle design for off-road use, in comparison with normal street traffic, increased demands with respect to robustness are made of the deployment method for detection of misuse.

Furthermore, the example method according to the present invention for estimating the roll angle may also be used in addition to a roll rate sensor to advantageously support the roll angle estimate via the roll rate sensor as an alternative path and/or may be used as a plausibility check on the deployment decision. Therefore, the deployment and reset behavior of the deployment methods for occupant protection systems are further improved by the additional option of roll angle determination.

An example device according to the present invention for determining the roll angle for occupant protection devices may have the advantage that two acceleration sensors are used for detecting the transverse acceleration and the vertical acceleration and an analyzer unit estimates the roll angle of the vehicle based on the transverse acceleration and vertical acceleration thereby detected, so the roll angle sensor may be omitted. To improve the estimate of the roll angle, the analyzer unit analyzes data from at least one additional sensor unit in the vehicle, this sensor unit ascertaining additional driving dynamics data and supplying the data for calculation of a centripetal acceleration. The driving dynamics data include a vehicle speed, a yaw angle and a float angle. Since a roll rate sensor is no longer necessary to estimate the roll angle, the cost of the particular control unit may be reduced by omitting the roll rate sensor. If the example device according to the present invention is used as an alternative path and to support the roll angle calculation by the roll rate sensor, then two alternative paths are advantageously available for determining the roll angle, thus allowing an increase in the robustness of the deployment method for occupant protection devices.

It may be advantageous in particular that accelerations caused by steering movements and/or rolling movements caused by road surface irregularities are determined and taken into account as correction factors in ascertaining the prevailing transverse acceleration and the prevailing vertical acceleration and thus in estimating the roll angle. To calculate correction factors for the rolling movement, it is assumed that the rolling movements are to be considered in first approximation as a rotation of the central sensor system about an imaginary fulcrum. The vertical acceleration sensor then "sees" an additional "centrifugal force component" and the transverse acceleration sensor detects an additional tangential component when there is a change in the roll rate. Correction factors for the vertical acceleration and transverse acceleration may then be determined using the measured roll rate. Thus, for example, a first additional transverse acceleration component and an additional vertical acceleration component may be calculated as correction factors to compensate for road surface irregularities. For example, first additional transverse acceleration component $\Delta a_{y1}$ may be calculated according to the equation $\Delta a_{y1} = \dot{\omega}_x \cdot r_z$ and additional vertical acceleration component $\Delta a_z$ may be calculated according to equation $\Delta a_z = \omega_x^2 \cdot r_z$.

To calculate correction factors for the steering movement, it is assumed that a steering movement during a normal driving situation has a fulcrum near the rear axle; the transverse acceleration sensor therefore senses an additional tangential acceleration component, which is calculated as the second additional transverse acceleration component. The vertical acceleration sensor is not affected in a steering operation. A sensor in the x direction, which would sense additional centrifugal forces, is not taken into account in this example analysis. A second additional transverse acceleration component $\Delta a_{y2}$ may be calculated, for example, according to the equation $\Delta a_{y2} = \dot{\omega}_x \cdot r_x$.

The example method and device according to the present invention for determining the roll angle for occupant protection devices show the great potential for improvement in the direct calculation of the roll angle when additional sensor information is used to improve the measured values of the central sensors via correction factors and alternatively to calculate quantities of the equation system for the roll angle calculation, such as the centripetal acceleration. This improves the accuracy of the roll angle estimate, in particular at low roll angle values and with vibrations in the vehicle suspension systems occurring when driving over road surface irregularities or in the case of active steering movements on the part of the driver. In addition, the accuracy of the centripetal acceleration, estimated on the basis of the additional sensor data, in the low roll angle range is improved, thereby making it possible to reduce fluctuations in the estimated absolute roll angle.

BRIEF DESCRIPTION OF THE DRAWINGS

Exemplary embodiments of the present invention are illustrated in the figures and explained in greater detail below.

FIG. 1 shows a schematic block diagram of an example device for determining the roll angle for occupant protection devices.

FIG. 2 shows a schematic diagram of a model concept of the relationships in the case of minor road surface irregularities.

FIG. 3 shows a schematic diagram of a model concept of the relationships in the case of a steering movement.

FIG. 4 shows a schematic diagram of the curves of various methods for estimating the roll angle while driving in a sharp curve.

FIG. 5 shows a schematic diagram of the curves of various methods for estimating the roll angle while driving in a sharp curve with a steering movement for driving out of the sharp curve.

FIG. 6 shows a higher-resolution diagram of the curves of various methods for estimating the roll angle from FIG. 5.

DETAILED DESCRIPTION OF THE EXAMPLE EMBODIMENTS

In general, early decisions for deployment of occupant protection devices, e.g., seat belt tightening systems, head airbags, window airbags, and roll bars, are necessary and appropriate in the event of a rollover. In addition to the lateral vehicle speed, the roll angle at the beginning of such a rollover event therefore constitutes an important parameter for calculating the rollover in advance. With the conventional technical approaches, the signals of the transverse acceleration sensor and the vertical acceleration sensor are used only for detecting the type of rollover and for performing a plausibility check on the roll rate measured with a roll rate sensor and the roll angle calculated therefrom.

Furthermore, in a conventional method, absolute roll angle of a vehicle is continuously calculated with the help of signals of a transverse acceleration sensor and a vertical acceleration sensor during stable driving situations as the output roll angle to improve the calculation of deployment decisions in corresponding submodules of an occupant protection system.

According to the present invention, an example method for determining the roll angle for occupant protection devices and a corresponding device are proposed, which detect a transverse acceleration and a vertical acceleration of the vehicle and estimate the roll angle of the vehicle based on the transverse acceleration and vertical acceleration thereby detected, additional driving dynamics quantities being ascertained, including a vehicle speed, a yaw angle and a float angle, and a centripetal acceleration being calculated to improve the estimate of the roll angle from these driving dynamics quantities.

As FIG. 1 shows, a vehicle 1 includes a device according to the present invention for determining the roll angle for an occupant protection device 200 having a first acceleration sensor 10 for detecting a transverse acceleration $a_y$, a second acceleration sensor 20 for detecting a vertical acceleration $a_z$, a sensor unit 30 for ascertaining additional driving dynamics quantities, including a vehicle speed v, a yaw angle ψ, and a float angle β, and an analyzer unit 100 which calculates roll angle α of the vehicle based on detected transverse acceleration $a_y$ and detected vertical acceleration $a_z$ and calculates a centripetal acceleration $$\frac{v^2}{r}$$

to improve the estimate of roll angle α from these driving dynamics quantities. In the exemplary embodiments depicted here, first and second acceleration sensors 10, 20 are integrated into a central sensor system 2.

The mathematical principles and the equations derived from them, which are used by analyzer unit 100 for continuous determination of the instantaneous roll angle, are described below. The accelerations, which may be measured by a sensor at the center of gravity of the vehicle in proximity to the roll axis, may be calculated in world coordinates by analyzer unit 100 from the external accelerations acting on the vehicle via homogeneous transformation according to equation (1).

$$\vec{a}_{sensor} = X \cdot \vec{a}_{external} \quad (1)$$

The external acceleration vector is composed of an acceleration component in the x direction, which is influenced by depressing the accelerator or the brake pedal of the vehicle, a centripetal acceleration component in the y direction, which occurs in particular when turning a corner or driving in a circle, and the gravitational acceleration component in the z direction. Rotation of the vehicle about its longitudinal axis by a roll angle α is represented by multiplying the external acceleration vector by a 3×3 matrix according to equation (2).

$$\vec{a}_{sensor} = \begin{pmatrix} 1 & 0 & 0 \\ 0 & \cos\alpha & -\sin\alpha \\ 0 & \sin\alpha & \cos\alpha \end{pmatrix} * \begin{pmatrix} -\dot{v} \\ \frac{v^2}{r} \\ g \end{pmatrix} \quad (2)$$

Since first acceleration sensor 10 detects only transverse acceleration $a_y$ of the vehicle, i.e., the y component, and second acceleration sensor 20 detects only vertical acceleration $a_z$ of the vehicle, i.e., the z component, only relationships (3) and (4) which pertain to the x and y components of the vehicle acceleration are considered below after the matrix multiplication.

$$a_y = \cos\alpha * \frac{v^2}{r} - \sin\alpha * g \quad (3)$$

$$a_z = \sin\alpha * \frac{v^2}{r} + \cos\alpha * g \quad (4)$$

In equations (3) and (4), in addition to roll angle α, centripetal acceleration $$\frac{v^2}{r}$$

is also unknown, but acceleration components $a_y$ and $a_z$ are available as measured values and acceleration g due to gravity is available as a constant. For the following methods, knowledge of vehicle speed v or curve radius r is not necessary, so centripetal acceleration $$\frac{v^2}{r}$$

may be determined as a single quantity. Centripetal acceleration $$\frac{v^2}{r}$$

has so far been determined from equation (3) and (4), for example.

By squaring and then adding equations (3) and (4), centripetal acceleration $$\frac{v^2}{r}$$

may be determined according to equation (5).

$$\frac{v^2}{r} = \pm\sqrt{a_y^2 + a_z^2 - g^2} \quad (5)$$

This type of calculation of centripetal acceleration $$\frac{v^2}{r}$$

has a very sensitive response to slight fluctuations in vertical acceleration $a_z$ in particular, which in turn results in great fluctuations in the low roll angle range in calculating the roll angle according to equation (6).

$$\alpha = \frac{-a_y * g + a_z * v^2/r}{g^2 + (v^2/r^2)} \quad (6)$$

An improvement may be achieved by basing centripetal acceleration $$\frac{v^2}{r}$$

not on equation (5) but instead on an alternative path. Based on vehicle speed v thereby ascertained, yaw angle ψ and float angle β, analyzer unit 100 calculates centripetal acceleration $$\frac{v^2}{r}$$

according to equation (7):

$$v^2/r = v*(\dot{\psi}+\dot{\beta}) \tag{7}$$

If these driving dynamics quantities are available from other sensor systems in the vehicle, the direct estimate of the roll angle may be improved significantly in this way, in particular in the range of low roll angles. FIG. 4 illustrates this on the basis of a schematic diagram of the curves of various methods for estimating the roll angle while driving in a sharp curve. Roll angle curve $\alpha_R$ represents the curve of roll angle α ascertained by a reference sensor system. Roll angle curve $\alpha_H$ shown with a dotted line represents the curve of roll angle α calculated using equation (6) when centripetal acceleration $$\frac{v^2}{r}$$

is determined using equation (5). Roll angle curve $\alpha_{E1}$ shown in bold represents the curve of roll angle α calculated using equation (6) when centripetal acceleration $$\frac{v^2}{r}$$

is determined using equation (7). The improved estimate of centripetal acceleration $$\frac{v^2}{r}$$

according to equation (7) produces much less fluctuation in the low roll angle range in roll angle curve $\alpha_{E1}$ than in roll angle curve $\alpha_H$ using the previous estimate of centripetal acceleration $$\frac{v^2}{r}$$

according to equation (5).

Small rolling movements of vehicle 1 are caused by steering movements or road surface irregularities. To calculate correction factors for rolling movements caused by road surface irregularities which falsify the estimate of the direct roll angle values, it is assumed that the rolling movements may be considered in first approximation as a rotation of central sensor system 2 about an imaginary fulcrum 3. FIG. 2 therefore shows a schematic diagram of a model concept of the relationships when there are minor road surface irregularities that might cause additional rolling. With the help of the roll rate measured by a rotational rate sensor, for example, correction factors $\Delta a_{y1}$, $\Delta a_{y2}$, $\Delta a_z$ for vertical acceleration $a_z$ and transverse acceleration $a_y$ may then be ascertained. First acceleration sensor 10 for ascertaining transverse acceleration $a_y$ ascertains a first additional tangential component $\Delta a_{y1}$ when there is a change in roll rate caused by the rolling movement, this tangential component being determinable according to equation (8).

$$\Delta a_{y1} = \dot{\omega}_x \cdot r_z \tag{8}$$

Second acceleration sensor 20 for ascertaining vertical acceleration a, ascertains an additional centrifugal component $\Delta a_z$, which may be determined according to equation (9), when there is a change in roll rate caused by the rolling movement.

$$\Delta a_z = \omega_x^2 \cdot r_z \tag{9}$$

In addition, centripetal acceleration $$\frac{v^2}{r}$$

generated according to equation (7) is also adjusted. The effects of these rolling movements on vertical acceleration $\alpha_z$ and transverse acceleration $a_y$ may be corrected by determining first additional transverse acceleration component $\Delta a_{y1}$ and additional vertical acceleration component $\Delta a_z$.

The situation is similar with steering movements by the driver. To calculate correction factors for rolling movements caused by steering movements which could falsify the estimate of the direct roll angle values, it is assumed that a steering operation may be considered as a rotation of central sensor system 2 about an imaginary fulcrum 4 which is situated near the rear axle during a normal driving situation. FIG. 3 therefore shows a schematic diagram of a model concept of the relationships in a steering operation. As FIG. 3 shows, with first acceleration sensor 10, which ascertains transverse acceleration $a_y$, central sensor system 2 senses an additional second tangential acceleration component and ascertains a second additional transverse acceleration component $\Delta a_{y2}$. This is also true of the values for centripetal acceleration $$\frac{v^2}{r},$$

which are calculated according to equations (5) and (7) and are also adjusted in this case. For the additional effect on transverse acceleration component $a_y$, the second additional transverse acceleration component is obtained according to equation (10).

$$\Delta a_y = \dot{\omega}_z \cdot r_x \tag{10}$$

Second acceleration sensor 20 for ascertaining vertical acceleration $a_z$ is not affected in a steering operation. A sensor in the x direction, which would sense additional centrifugal forces, is not taken into account in this analysis.

If equations (3) and (4) are combined with the corrections according to equations (8), (9) and (10), this yields a new equation system having equations (11) and (12):

$$a_y = \cos\alpha \cdot \frac{v^2}{r} - \sin\alpha \cdot g + \dot{\omega}_x \cdot r_z + \dot{\omega}_z \cdot r_x \tag{11}$$

$$a_z = \sin\alpha \cdot \frac{v^2}{r} + \cos\alpha \cdot g + \omega_x^2 \cdot r_z \tag{12}$$

Similar corrections are also taken into account to determine centripetal acceleration $$\frac{v^2}{r}$$

in equations (5) and (7).

FIG. 5 shows a schematic diagram of the curves of various methods for estimating the roll angle when driving in a sharp curve, including a steering motion when driving out of this sharp curve. By analogy with FIG. 4, roll angle curve $\alpha_R$ represents the curve of roll angle $\alpha$ ascertained by a reference sensor. Roll angle curve $\alpha_{E1}$, shown with a dotted line, represents the curve of roll angle $\alpha$ calculated using equation (6) when centripetal acceleration $$\frac{v^2}{r}$$

is determined using equation (7). When driving out of a sharp curve, the driver executes a steering movement, which has an influence on the acceleration signals, and roll angle calculation function $\alpha_{E1}$, shown with a dotted line, overshoots in comparison with reference measurement $\alpha_R$.

FIG. 6 shows a diagram of the curves of various methods for estimating the roll angle from FIG. 5 with a higher resolution, showing an additional roll angle curve $\alpha_{E2}$ in bold, representing the curve of roll angle $\alpha$ calculated using equation (6) when centripetal acceleration $$\frac{v^2}{r}$$

is determined using equation (7), transverse acceleration $a_y$ is calculated according to equation (9) and vertical acceleration $a_z$ is calculated according to equation (10). As FIG. 6 shows, the deviations from reference curve $\alpha_R$ in roll angle curve $\alpha_{E1}$ caused by the additional roll and steering movements are compensated almost completely by the correction factors taken into account in roll angle curve $\alpha_{E2}$. The roll angle estimate is more accurate in the higher angle range and the fluctuations due to the steering movement are compensated almost completely.

The example method and device according to the present invention allow an accurate and robust determination of roll angle by utilizing the acceleration signals as well as the additional driving dynamics signals of other sensor systems, so that rollovers are reliably detectable. Therefore, the example method and device according to the present invention for estimating the roll angle may be used in rollover detection, for example, as an alternative path to support the roll angle calculation and/or as a plausibility check on the decision to deploy. Omitting the roll rate sensor would further lower the cost of the particular control unit, so that even vehicles in the lower price ranges could be equipped with this control unit. The combination with existing sensor systems already integrated into the vehicle yields an increased benefit here with regard to the stability and robustness of the deployment method. This is true for all-terrain and off-road vehicles in particular, because increased demands with respect to robustness are to be expected of the deployment method for recognition of misuse because of the vehicle design for driving off-road in comparison with normal street traffic.

What is claimed is:

1. A method for determining a roll angle for an occupant protection device, comprising:
   detecting a transverse acceleration and a vertical acceleration of a vehicle;
   estimating the roll angle of the vehicle based on the detected transverse acceleration and the detected vertical acceleration;
   ascertaining additional driving dynamics quantities, the additional driving dynamics quantities including a vehicle speed, a yaw angle and a float angle;
   calculating a centripetal acceleration from the driving dynamics quantities; and
   using the centripetal acceleration to improve the estimate of the roll angle.

2. The method as recited in claim 1, further comprising:
   determining at least one of accelerations caused by steering movements and rolling movements caused by road surface irregularities; and
   taking into account the at least one of the accelerations caused by steering movements and the rolling movements caused by road surface irregularities as correction factors in ascertaining the transverse acceleration and the vertical acceleration and thus in estimating the roll angle.

3. The method as recited in claim 2, wherein the rolling movement caused by road surface irregularities is considered to be a rotation about an imaginary fulcrum in a normal driving state and is calculated as a first additional transverse acceleration component and as an additional vertical acceleration component.

4. The method as recited in claim 3, wherein the first additional transverse acceleration component $\Delta a_{y1}$ is calculated according to an equation $\Delta a_{y1} = \dot{\omega}_x \cdot r_z$ and the additional vertical acceleration component $\Delta a_z$ is calculated according to an equation $\Delta a_z = \omega_x^2 \cdot r_z$, wherein $r_z$ is the radius of rotation about the imaginary fulcrum extending along the z-axis from the imaginary fulcrum to a sensor system for detecting the transverse acceleration and the vertical acceleration, and $\omega_x$ is an angular velocity about the x-axis.

5. The method as recited in claim 4, wherein a steering movement has a fulcrum near a rear axle during a normal driving situation, an acceleration thereby induced being calculated as a second additional transverse acceleration component.

6. The method as recited in claim 5, wherein the second additional transverse acceleration component $\Delta a_{y2}$ is calculated according to an equation $\Delta a_{y2} = \dot{\omega}_z \cdot r_x$, wherein $r_x$ is the radius of rotation about the imaginary fulcrum extending along the x-axis from the imaginary fulcrum to the sensor system for detecting the transverse acceleration and the vertical acceleration, and $\dot{\omega}_z$ is a time derivative of an angular velocity about the z-axis.

7. The method as recited in claim 1, wherein the centripetal acceleration $$\left(\frac{v^2}{r}\right)$$

is calculated according to the equation $$\frac{v^2}{r} = v \cdot (\dot{\psi} + \dot{\beta}).$$

wherein v is the vehicle speed, r is the curve radius, $\psi$ is the yaw angle, and $\beta$ is the float angle.

8. The method as recited in claim 7, wherein the transverse acceleration $a_y$ is calculated according to the equation $$a_y = \cos\alpha \cdot \frac{v^2}{r} - \sin\alpha \cdot g + \Delta a_{y1} + \Delta a_{y2}$$

and the vertical acceleration $a_z$ is calculated according to the equation $$a_z = \sin\alpha \cdot \frac{v^2}{r} + \cos\alpha \cdot g + \Delta a_z.$$

and wherein $\alpha$ is the roll angle, g is gravity, $\Delta a_{y1}$ is a first additional transverse acceleration component, $\Delta a_{y2}$ is a second additional transverse acceleration component, and $\Delta a_z$ an additional vertical acceleration component.

9. The method as recited in claim 1, wherein the roll angle $\alpha$ is estimated according to an equation $$\alpha = \frac{-a_y * g + a_z * \frac{v^2}{r}}{g^2 + \left(\frac{v^2}{r}\right)^2},$$

wherein $a_y$ is the transverse acceleration, g is gravity, $a_z$ is the vertical acceleration, $$\left(\frac{v^2}{r}\right)$$

is the centripetal acceleration, with v being the vehicle speed and r being the curve radius.

10. A device for determining a roll angle for an occupant protection device, comprising:
 a first acceleration sensor adapted to detect a transverse acceleration of a vehicle;
 a second acceleration sensor adapted to detect a vertical acceleration of the vehicle;
 at least one additional sensor unit adapted to ascertain and supply additional driving dynamics quantities, including a vehicle velocity, a yaw angle and a float angle; and
 an analyzer unit adapted to estimate the roll angle of the vehicle based on the transverse acceleration detected and the vertical acceleration detected, the analyzer unit improving the estimate of the roll angle by calculating a centripetal acceleration from the vehicle velocity, the yaw angle and the float angle quantities.

* * * * *